United States Patent
Echigo et al.

(10) Patent No.: US 11,233,262 B2
(45) Date of Patent: Jan. 25, 2022

(54) ELECTROCHEMICAL ELEMENT, ELECTROCHEMICAL MODULE, ELECTROCHEMICAL DEVICE, ENERGY SYSTEM, SOLID OXIDE FUEL CELL AND MANUFACTURING METHOD FOR ELECTROCHEMICAL ELEMENT

(71) Applicant: Osaka Gas Co., Ltd., Osaka (JP)

(72) Inventors: Mitsuaki Echigo, Osaka (JP); Hisao Ohnishi, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 131 days.

(21) Appl. No.: 16/497,470

(22) PCT Filed: Mar. 30, 2018

(86) PCT No.: PCT/JP2018/013689
§ 371 (c)(1),
(2) Date: Sep. 25, 2019

(87) PCT Pub. No.: WO2018/181922
PCT Pub. Date: Oct. 4, 2018

(65) Prior Publication Data
US 2020/0028193 A1    Jan. 23, 2020

(30) Foreign Application Priority Data
Mar. 31, 2017  (JP) .............................. JP2017-073162

(51) Int. Cl.
*H01M 8/1226* (2016.01)
*H01M 8/04007* (2016.01)
*H01M 8/243* (2016.01)

(52) U.S. Cl.
CPC ..... *H01M 8/1226* (2013.01); *H01M 8/04067* (2013.01); *H01M 8/243* (2013.01)

(58) Field of Classification Search
CPC .................................................. H01M 8/1226
(Continued)

(56) References Cited

U.S. PATENT DOCUMENTS 6,737,186 B2    5/2004    Janousek et al.
9,587,297 B2    3/2017    Ishii et al.
(Continued)

FOREIGN PATENT DOCUMENTS

EP      3095888 A1      11/2016
JP      2005285427 A    10/2005
(Continued)

OTHER PUBLICATIONS

Antepara et al., "Electrochemical Behavior of Metal-Supported SOFCs Under High Fuel Utilization and Their Durability," Journal of Fuel Cell Science and Technology, 2012, pp. 1-8, vol. 9.

*Primary Examiner* — James M Erwin
(74) *Attorney, Agent, or Firm* — The Webb Law Firm (57) ABSTRACT

Provided are an electrochemical element and the like that have both durability and high performance as well as excellent reliability. The electrochemical element includes a metal support, and an electrode layer formed on/over the metal support. The metal support is made of any one of a Fe—Cr based alloy that contains Ti in an amount of 0.15 mass % or more and 1.0 mass % or less, a Fe—Cr based alloy that contains Zr in an amount of 0.15 mass % or more and 1.0 mass % or less, and a Fe—Cr based alloy that contains Ti and Zr, a total content of Ti and Zr being 0.15 mass % or more and 1.0 mass % or less.

12 Claims, 3 Drawing Sheets

(58) Field of Classification Search
USPC .......................................................... 429/489
See application file for complete search history.

(56) References Cited

U.S. PATENT DOCUMENTS

| | | | |
|---|---|---|---|
| 10,544,490 B2 | 1/2020 | Hatano et al. | |
| 2007/0231667 A1* | 10/2007 | Guan | H01M 4/905 |
| | | | 429/482 |
| 2009/0117414 A1 | 5/2009 | Ringel | |
| 2010/0098994 A1 | 4/2010 | Schuisky et al. | |
| 2011/0269047 A1* | 11/2011 | Tucker | H01M 4/9033 |
| | | | 429/452 |
| 2013/0017463 A1* | 1/2013 | Kaupert | H01M 8/0625 |
| | | | 429/423 |
| 2016/0260991 A1* | 9/2016 | Shapiro | H01M 8/0668 |
| 2017/0309941 A1 | 10/2017 | Echigo et al. | |
| 2017/0321310 A1 | 11/2017 | Hatano et al. | |
| 2019/0013527 A1* | 1/2019 | Schafbauer | H01M 8/0206 |

FOREIGN PATENT DOCUMENTS

| | | | |
|---|---|---|---|
| JP | 2006107936 A | 4/2006 | |
| JP | 2008529244 A | 7/2008 | |
| JP | 2009139124 A | 6/2009 | |
| JP | 2011179063 A | 9/2011 | |
| JP | 2013257953 A | 12/2013 | |
| JP | 2013257989 A | 12/2013 | |
| JP | 201630854 A | 3/2016 | |
| JP | 201698389 A | 5/2016 | |
| KR | 1020110047999 A | 5/2011 | |
| WO | 2011053041 A2 | 5/2011 | |
| WO | 2016017692 A1 | 2/2016 | |
| WO | 2016043328 A1 | 3/2016 | |

* cited by examiner

ELECTROCHEMICAL ELEMENT, ELECTROCHEMICAL MODULE, ELECTROCHEMICAL DEVICE, ENERGY SYSTEM, SOLID OXIDE FUEL CELL AND MANUFACTURING METHOD FOR ELECTROCHEMICAL ELEMENT

CROSS-REFERENCE TO RELATED APPLICATIONS

This application is the United States national phase of International Application No. PCT/JP2018/013689 filed Mar. 30, 2018, and claims priority to Japanese Patent Application No. 2017-073162 filed Mar. 31, 2017, the disclosures of which are hereby incorporated by reference in their entirety.

TECHNICAL FIELD

The present invention relates to an electrochemical element including a metal support and an electrode layer, and the like.

BACKGROUND ART

In conventional metal-supported solid oxide fuel cells (SOFCs), a Fe—Cr based alloy such as Crofer 22 APU whose thermal expansion coefficient is close to those of an electrode material, an electrolyte material, and the like for the SOFC is used in metal support substrates for the SOFCs.

PRIOR ART DOCUMENTS

Non-Patent Document

Non-Patent Document 1: I. Antepara, et at, "Electrochemical Behavior of Metal-Supported SOFCs Under High Fuel Utilization and Their Durability", Journal of Fuel Cell Science and Technology, APRIL 2012, Vol. 9/021009-1 to 8

DISCLOSURE OF THE INVENTION

Problem to be Solved by the Invention

However, as shown in the prior art, there is a problem in that it is difficult to ensure the durability of metal-supported SOFCs in which a conventional metal substrate made of Crofer 22 APU or the like is used, under conditions where high performance is to be achieved (e.g., a condition where an electric current density is increased and a condition where a fuel usage rate is increased).

It should be noted that the above-described SOFCs, solid oxide electrolytic cells (referred to as "SOECs" hereinafter) that produce hydrogen through electrolysis of water, oxygen sensors using a solid oxide, and the like have a common basic structure. That is, electrochemical elements including a metal substrate, an electrode layer, and an electrolyte layer are used in the SOFCs, SOECs, and oxygen sensors. The above-described problem is common to the above-described electrochemical elements, SOFCs, SOECs, and oxygen sensors.

The present invention was achieved in light of the foregoing problem, and an object of the present invention is to provide an electrochemical element and the like that have both durability and high performance as well as excellent reliability.

Means for Solving Problem

A characteristic configuration of an electrochemical element for achieving the object includes a metal support, and an electrode layer formed on/over the metal support, wherein the metal support is made of any one of a Fe—Cr based alloy that contains Ti in an amount of 0.15 mass % or more and 1.0 mass % or less, a Fe—Cr based alloy that contains Zr in an amount of 0.15 mass % or more and 1.0 mass % or less, and a Fe—Cr based alloy that contains Ti and Zr, a total content of Ti and Zr being 0.15 mass % or more and 1.0 mass % or less.

Ti and Zr are likely to form stable carbides through reaction with carbon in a steel material. With the above-mentioned characteristic configuration, the metal support is made of any one of a Fe—Cr based alloy that contains Ti in an amount of 0.15 mass % or more and 1.0 mass % or less, a Fe—Cr based alloy that contains Zr in an amount of 0.15 mass % or more and 1.0 mass % or less, and a Fe—Cr based alloy that contains Ti and Zr, a total content of Ti and Zr being 0.15 mass % or more and 1.0 mass % or less, and the effect of improving oxidation resistance and high-temperature strength of the Fe—Cr based alloy is thus obtained, thus making it possible to suppress volatilization of Cr from the metal support even during long periods of use at high temperatures, and making it possible to realize an electrochemical element that has excellent durability.

It should be noted that the content of Ti is preferably 0.20 mass % or more, and more preferably 0.25 mass % or more. The reason for this is that the effect of improving oxidation resistance and high-temperature strength of the Fe—Cr based alloy due to the addition of Ti or Zr can be made greater. Moreover, the content of Ti is preferably 0.90 mass % or less, and more preferably 0.80 mass % or less. The reason for this is that an increase in the cost of the Fe—Cr based alloy due to the addition of Ti or Zr can be suppressed.

It should be noted that the content of Zr is preferably 0.20 mass % or more, and more preferably 0.25 mass % or more. The reason for this is that the effect of improving oxidation resistance and high-temperature strength of the Fe—Cr based alloy due to the addition of Ti or Zr can be made greater. Moreover, the content of Zr is preferably 0.90 mass % or less, and more preferably 0.80 mass % or less. The reason for this is that an increase in the cost of the Fe—Cr based alloy due to the addition of Ti or Zr can be suppressed.

It should be noted that the total content of Ti and Zr is preferably 0.20 mass % or more, and more preferably 0.25 mass % or more. The reason for this is that the effect of improving oxidation resistance and high-temperature strength of the Fe—Cr based alloy due to the addition of Ti or Zr can be made greater. Moreover, the total content of Ti and Zr is preferably 0.90 mass % or less, and more preferably 0.80 mass % or less. The reason for this is that an increase in the cost of the Fe—Cr based alloy due to the addition of Ti or Zr can be suppressed.

In another characteristic configuration of the electrochemical element according to the present invention, the metal support contains Cu in an amount of 0.10 mass % or more and 1.0 mass % or less.

Cu has an effect of reducing contact resistance (electric resistance). With the above-mentioned characteristic configuration, the metal support contains Cu in an amount of 0.10 mass % or more and 1.0 mass % or less, thus making it possible to suppress the electric resistance value of the electrochemical element to a low level, and making it possible to realize a high-performance electrochemical element.

It should be noted that the content of Cu is preferably 0.20 mass % or more, and more preferably 0.30 mass % or more. The reason for this is that the effect of reducing contact resistance due to the addition of Cu to the Fe—Cr based alloy can be made greater. Moreover, the content of Cu is preferably 0.90 mass % or less, and more preferably 0.70 mass % or less. The reason for this is that an increase in cost due to the addition of Cu to the Fe—Cr based alloy can be suppressed.

In another characteristic configuration of the electrochemical element according to the present invention, the metal support contains Cr in an amount of 18 mass % or more and 25 mass % or less.

The above-mentioned characteristic configuration makes it possible to bring the thermal expansion coefficient of the Fe—Cr based alloy close to the thermal expansion coefficients of a zirconia-based material and a ceria-based material contained in the materials for forming an electrode layer and an electrolyte layer of a SOFC, for example, thus making it possible to suppress breakage and separation of the electrode layer and the electrolyte layer even in a case where the electrochemical element is used at high temperatures or a heat cycle is performed, and making it possible to realize a highly reliable electrochemical element.

It should be noted that the content of Cr is more preferably 20 mass % or more. The reason for this is that the thermal expansion coefficient of the Fe—Cr based alloy can be brought closer to the thermal expansion coefficients of the zirconia-based material and the ceria-based material. Moreover, the upper limit of the content of Cr is more preferably 23 mass % or less. The reason for this is that an increase in the cost of the Fe—Cr based alloy can be suppressed.

In another characteristic configuration of the electrochemical element according to the present invention, the electrode layer is formed on/over one surface of the metal support, and the metal support is provided with a through hole that penetrates the metal support from one surface to the other surface.

With the above-mentioned characteristic configuration, the gas or the like that reacts in the electrode layer can be smoothly supplied from the other side of the metal support, thus making it possible to realize a high-performance electrochemical element.

In another characteristic configuration of the electrochemical element according to the present invention, the metal support is made of a magnetic substance.

With the above-mentioned characteristic configuration, the metal support can be fixed using a magnet when an electrode layer is formed on/over the metal support. Therefore, an electrolyte layer can be formed using a low-cost technique such as screen printing even in the case where the metal support is provided with a through hole, thus making it possible to realize a low-cost electrochemical element.

In another characteristic configuration of the electrochemical element according to the present invention, a portion or all of a surface of the metal support is covered with a metal oxide thin layer.

With the above-mentioned characteristic configuration, the metal oxide thin layer can suppress diffusion of the components such as Cr of the metal support to the electrode layer, thus making it possible to suppress a decrease in performance of the electrode layer, and making it possible to improve the performance of the electrochemical element.

The present invention can be favorably applied to an electrochemical element that includes an electrolyte layer and a counter electrode layer and in which the electrolyte layer is arranged on/over the electrode layer, and the counter electrode layer is arranged on/over the electrolyte layer.

In a characteristic configuration of an electrochemical module according to the present invention, a plurality of the above-described electrochemical elements are arranged in an assembled state.

With the above-mentioned characteristic configuration, the plurality of the above-described electrochemical elements are arranged in an assembled state, thus making it possible to obtain an electrochemical module that is compact, has high performance, and has excellent strength and reliability, while also suppressing material cost and processing cost.

A characteristic configuration of an electrochemical device according to the present invention includes at least the above-described electrochemical module and a reformer, and includes a fuel supply unit which supplies fuel gas containing a reducible component to the electrochemical module.

The above-mentioned characteristic configuration includes the electrochemical module and the reformer, and the fuel supply unit which supplies the fuel gas containing a reducible component to the electrochemical module, thus making it possible to use an existing raw fuel supply infrastructure such as city gas, and making it possible to realize an electrochemical device including the electrochemical module that has excellent durability, reliability, and performance. Also, it is easier to construct a system that recycles unused fuel gas discharged from the electrochemical module, thus making it possible to realize a highly efficient electrochemical device.

A characteristic configuration of an electrochemical device according to the present invention includes at least the above-described electrochemical module, and an inverter that extracts electrical power from the electrochemical module.

The above-mentioned characteristic configuration is preferable because it makes it possible to boost, using an inverter, electrical output obtained from the electrochemical module that has excellent durability, reliability, and performance, or to convert a direct current into an alternating current, and thus makes it easy to use the electrical output obtained from the electrochemical module.

A characteristic configuration of an energy system according to the present invention includes the above-described electrochemical device, and a waste heat management unit that reuses heat discharged from the electrochemical device.

The above-mentioned characteristic configuration includes the electrochemical device and the waste heat management unit that reuses heat discharged from the electrochemical device, thus making it possible to realize an energy system that has excellent durability, reliability, and performance as well as excellent energy efficiency. It should be noted that it is also possible to realize a hybrid system that has excellent energy efficiency by combination with a power generation system that generates power with use of combustion heat from unused fuel gas discharged from the electrochemical device.

A characteristic configuration of a solid oxide fuel cell according to the present invention includes the above-described electrochemical element, wherein a power generation reaction is caused therein.

With the above-mentioned characteristic configuration, it is possible to suppress deterioration of a metal-supported electrochemical element and maintain the performance of the fuel cell for a long period of time while high power generation performance is exhibited. It should be noted that a solid oxide fuel cell that can be operated in a temperature range of 650° C. or higher during the rated operation is more preferable because a fuel cell system that uses hydrocarbon-based raw fuel such as city gas can be constructed such that waste heat discharged from a fuel cell can be used in place of heat required to convert raw fuel to hydrogen, and the power generation efficiency of the fuel cell system can thus be improved. A solid oxide fuel cell that can be operated in a temperature range of 900° C. or lower during the rated operation is more preferable because the effect of suppressing volatilization of Cr from a metal-supported electrochemical element can be improved, and a solid oxide fuel cell that can be operated in a temperature range of 850° C. or lower during the rated operation is even more preferable because the effect of suppressing volatilization of Cr can be further improved.

A characteristic configuration of a manufacturing method for an electrochemical element according to the present invention is a manufacturing method for an electrochemical element including a metal support and an electrode layer, the metal support being made of any one of a Fe—Cr based alloy that contains Ti in an amount of 0.15 mass % or more and 1.0 mass % or less, a Fe—Cr based alloy that contains Zr in an amount of 0.15 mass % or more and 1.0 mass % or less, and a Fe—Cr based alloy that contains Ti and Zr, a total content of Ti and Zr being 0.15 mass % or more and 1.0 mass % or less, the method comprising an electrode layer forming step of forming an electrode layer with gas permeability on the metal support.

With the above-mentioned characteristic configuration, an electrochemical element that has excellent performance and durability and in which diffusion of elements from the metal support to the electrode layer is suppressed can be manufactured using a simple manufacturing method. Moreover, the metal support is made of any one of a Fe—Cr based alloy that contains Ti in an amount of 0.15 mass % or more and 1.0 mass % or less, a Fe—Cr based alloy that contains Zr in an amount of 0.15 mass % or more and 1.0 mass % or less, and a Fe—Cr based alloy that contains Ti and Zr, a total content of Ti and Zr being 0.15 mass % or more and 1.0 mass % or less, thus making it possible to suppress volatilization of Cr from the alloy even during long periods of use at high temperatures, and making it possible to realize an electrochemical element that has excellent durability.

BEST MODES FOR CARRYING OUT THE INVENTION

First Embodiment

Hereinafter, an electrochemical element E and a solid oxide fuel cell (SOFC) according to this embodiment will be described with reference to FIG. 1. The electrochemical element E is used as a constituent element of a solid oxide fuel cell that receives a supply of air and fuel gas containing hydrogen and generates power, for example. It should be noted that when the positional relationship between layers and the like are described in the description below, a counter electrode layer 6 side may be referred to as "upper portion" or "upper side", and an electrode layer 2 side may be referred to as "lower portion" or "lower side", with respect to an electrolyte layer 4, for example. In addition, in a metal substrate 1, a surface on/over which the electrode layer 2 is formed may be referred to as "front side", and a surface on an opposite side may be referred to as "back side".

Electrochemical Element

Figure 1:
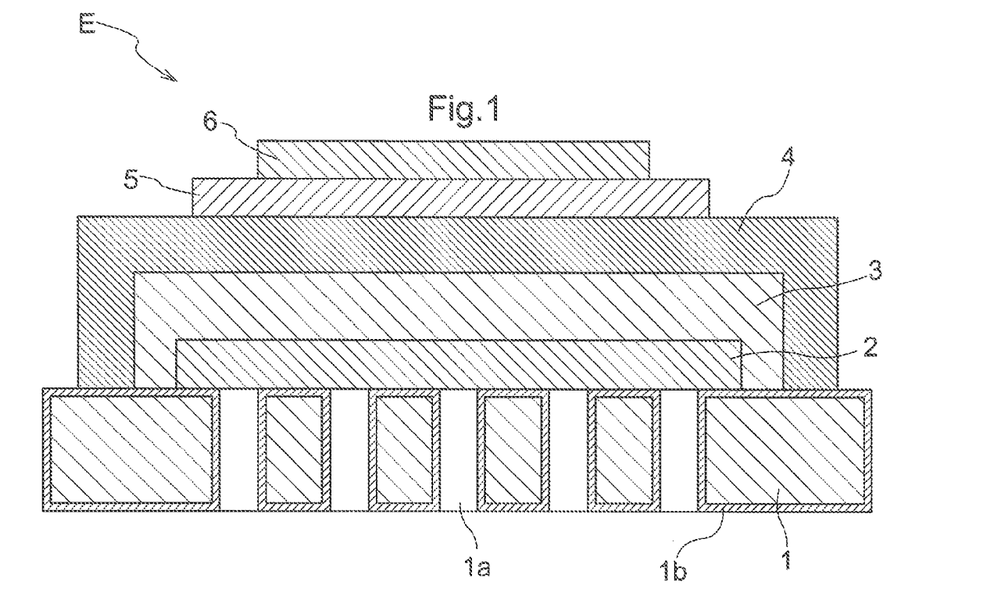
FIG. 1 is a schematic diagram showing a configuration of an electrochemical element.

As shown in FIG. 1, the electrochemical element E includes a metal substrate 1 (metal support), an electrode layer 2 formed on/over the metal substrate 1, an intermediate layer 3 formed on/over the electrode layer 2, and an electrolyte layer 4 formed on/over the intermediate layer 3. The electrochemical element E further includes a reaction preventing layer 5 formed on/over the electrolyte layer 4, and a counter electrode layer 6 formed on/over the reaction preventing layer 5. Specifically, the counter electrode layer 6 is formed above the electrolyte layer 4, and the reaction preventing layer 5 is formed between the electrolyte layer 4 and the counter electrode layer 6. The electrode layer 2 is porous, and the electrolyte layer 4 is dense.

Metal Substrate

The metal substrate 1 plays a role as a support that supports the electrode layer 2, the intermediate layer 3, the electrolyte layer 4, and the like and maintains the strength of the electrochemical element E. A material that has excellent electron conductivity, thermal resistance, oxidation resistance, and corrosion resistance is used as the material for forming the metal substrate 1. It should be noted that although a plate-shaped metal substrate 1 is used as the metal support in this embodiment, a metal support having another shape such as a box shape or cylindrical shape can also be used.

It should be noted that the metal substrate 1 need only have a strength sufficient for serving as the support for forming the electrochemical element, and can have a thickness of approximately 0.1 mm to 2 mm, preferably approximately 0.1 mm to 1 mm, and more preferably approximately 0.1 mm to 0.5 mm, for example.

In this embodiment, the metal substrate 1 is made of any one of a Fe—Cr based alloy that contains Ti in an amount of 0.15 mass % or more and 1.0 mass % or less, a Fe—Cr based alloy that contains Zr in an amount of 0.15 mass % or more and 1.0 mass % or less, and a Fe—Cr based alloy that contains Ti and Zr, a total content of Ti and Zr being 0.15 mass % or more and 1.0 mass % or less. In addition, the metal substrate 1 may contain Cu in an amount of 0.10 mass % or more and 1.0 mass % or less, and may contain Cr in an amount of 18 mass % or more and 25 mass % or less.

The metal substrate 1 is provided with a plurality of through holes 1a that penetrate the surface on the front side and the surface on the back side. It should be noted that the through holes 1a can be provided in the metal substrate 1 through mechanical, chemical, or optical piercing processing, for example. The through holes 1a have a function of transmitting gas from the surface on the back side of the metal substrate 1 to the surface on the front side thereof. Porous metal can also be used to impart gas permeability to the metal substrate 1. A metal sintered body, a metal foam, or the like can also be used as the metal substrate 1, for example.

A metal oxide thin layer 1b serving as a diffusion suppressing layer is provided on/over the surfaces of the metal substrate 1. That is, the diffusion suppressing layer is formed between the metal substrate 1 and the electrode layer 2, which will be described later. The metal oxide thin layer 1b is provided not only on/over the surface of the metal substrate 1 exposed to the outside but also the surface (interface) that is in contact with the electrode layer 2 and the inner surfaces of the through holes 1a. Element interdiffusion that occurs between the metal substrate 1 and the electrode layer 2 can be suppressed due to this metal oxide thin layer 1b. For example, when ferrite-based stainless steel containing chromium is used in the metal substrate 1, the metal oxide thin layer 1b is mainly made of a chromium oxide. The metal oxide thin layer 1b containing the chromium oxide as the main component suppresses diffusion of chromium atoms and the like of the metal substrate 1 to the electrode layer 2 and the electrolyte layer 4. The metal oxide thin layer 1b need only have such a thickness that allows both high diffusion preventing performance and low electric resistance to be achieved. For example, it is preferable that the thickness is on the order of submicrons to several microns.

The metal oxide thin layer 1b can be formed using various techniques, but it is favorable to use a technique of oxidizing the surface of the metal substrate 1 to obtain a metal oxide. Also, the metal oxide thin layer 1b may be formed on/over the surface of the metal substrate 1 by using a PVD technique such as a sputtering technique or PLD technique, a CVD technique, or a spray coating technique (a technique such as thermal spraying technique, an aerosol deposition technique, an aerosol gas deposition technique, a powder jet deposition technique, a particle jet deposition technique, or a cold spraying technique), or may be formed by plating and oxidation treatment. Furthermore, the metal oxide thin layer 1b may also contain a spinel phase that has high electron conductivity, or the like.

When a ferrite-based stainless steel material is used to form the metal substrate 1, its thermal expansion coefficient is close to that of YSZ (yttria-stabilized zirconia), GDC (gadolinium-doped ceria; also called CGO), or the like, which is used as the material for forming the electrode layer 2 and the electrolyte layer 4. Accordingly, even if low and high temperature cycling is repeated, the electrochemical element E is not likely to be damaged. Therefore, this is preferable due to being able to realize an electrochemical element E that has excellent long-term durability.

Electrode Layer

As shown in FIG. 1, the electrode layer 2 can be provided as a thin layer in a region that is larger than the region provided with the through holes 1a, on the front surface of the metal substrate 1. When it is provided as a thin layer, the thickness can be set to approximately 1 µm to 100 µm, and preferably 5 µm to 50 µm, for example. This thickness makes it possible to ensure sufficient electrode performance while also achieving cost reduction by reducing the used amount of expensive electrode layer material. The region provided with the through holes 1a is entirely covered with the electrode layer 2. That is, the through holes 1a are formed inside the region of the metal substrate 1 in which the electrode layer 2 is formed. In other words, all the through holes 1a are provided facing the electrode layer 2.

A composite material such as NiO-GDC, Ni-GDC, NiO—YSZ, Ni—YSZ, CuO—$CeO_2$, or Cu—$CeO_2$ can be used as the material for forming the electrode layer 2, for example. In these examples, GDC, YSZ, and $CeO_2$ can be called the aggregate of the composite material. It should be noted that it is preferable to form the electrode layer 2 using low-temperature heating (not performing heating treatment in a high temperature range of higher than 1100° C., but rather performing a wet process using heating treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Due to these processes that can be used in a low temperature range, a favorable electrode layer 2 is obtained without using heating in a high temperature range of higher than 1100° C., for example. Therefore, this is preferable due to being able to prevent damage to the metal substrate 1, suppress element interdiffusion between the metal substrate 1 and the electrode layer 2, and realize an electrochemical element that has excellent durability. Furthermore, using low-temperature heating makes it possible to facilitate handling of raw materials and is thus more preferable.

The inside and the surface of the electrode layer 2 are provided with a plurality of pores in order to impart gas permeability to the electrode layer 2.

That is, the electrode layer 2 is formed as a porous layer. The electrode layer 2 is formed to have a denseness of 30% or more and less than 80%, for example.

Regarding the size of the pores, a size suitable for smooth progress of an electrochemical reaction can be selected as appropriate. It should be noted that the "denseness" is a ratio of the material of the layer to the space and can be represented by a formula "1—porosity", and is equivalent to relative density.

Intermediate Layer

As shown in FIG. 1, the intermediate layer 3 can be formed as a thin layer on/over the electrode layer 2 so as to cover the electrode layer 2. When it is formed as a thin layer, the thickness can be set to approximately 1 µm to 100 µm, preferably approximately 2 µm to 50 µm, and more preferably approximately 4 µm to 25 µm, for example. This thickness makes it possible to ensure sufficient performance while also achieving cost reduction by reducing the used amount of expensive intermediate layer material. YSZ (yttria-stabilized zirconia), SSZ (scandium-stabilized zirconia), GDC (gadolinium-doped ceria), YDC (yttrium-doped ceria), SDC (samarium-doped ceria), or the like can be used as the material for forming the intermediate layer 3. In particular, ceria-based ceramics are favorably used.

It is preferable to form the intermediate layer 3 using low-temperature heating (not performing heating treatment in a high temperature range of higher than 1100° C., but rather performing a wet process using heating treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Due to these film formation processes that can be used in a low temperature range, an intermediate layer 3 is obtained without using heating in a high temperature range of higher than 1100° C., for example. Therefore, it is possible to prevent damage to the metal substrate 1, suppress element interdiffusion between the metal substrate 1 and the electrode layer 2, and realize an electrochemical element E that has excellent durability. Furthermore, using low-temperature heating makes it possible to facilitate handling of raw materials and is thus more preferable.

It is preferable that the intermediate layer 3 has oxygen ion (oxide ion) conductivity. It is more preferable that the intermediate layer 3 has both oxygen ion (oxide ion) conductivity and electron conductivity, namely mixed conductivity. The intermediate layer 3 that has these properties is suitable for application to the electrochemical element E.

Electrolyte Layer

As shown in FIG. 1, the electrolyte layer 4 is formed as a thin layer on/over the intermediate layer 3 so as to cover the electrode layer 2 and the intermediate layer 3. Specifically, as shown in FIG. 1, the electrolyte layer 4 is provided on/over both the intermediate layer 3 and the metal substrate 1 (spanning the intermediate layer 3 and the metal substrate 1). Configuring the electrolyte layer 4 in this manner and joining the electrolyte layer 4 to the metal substrate 1 make it possible to allow the electrochemical element to have excellent toughness as a whole.

Also, as shown in FIG. 1, the electrolyte layer 4 is provided in a region that is larger than the region provided with the through holes 1a, on/over the front surface of the metal substrate 1. That is, the through holes 1a are formed inside the region of the metal substrate 1 in which the electrolyte layer 4 is formed.

The leakage of gas from the electrode layer 2 and the intermediate layer 3 can be suppressed in the vicinity of the electrolyte layer 4. A description of this will be given. When the electrochemical element E is used as a constituent element of a SOFC, gas is supplied from the back side of the metal substrate 1 through the through holes 1a to the electrode layer 2 during the operation of the SOFC. In a region where the electrolyte layer 4 is in contact with the metal substrate 1, leakage of gas can be suppressed without providing another member such as a gasket. It should be noted that although the entire vicinity of the electrode layer 2 is covered with the electrolyte layer 4 in this embodiment, a configuration in which the electrolyte layer 4 is provided on/over the electrode layer 2 and the intermediate layer 3 and a gasket or the like is provided in its vicinity may also be adopted.

YSZ (yttria-stabilized zirconia), SSZ (scandium-stabilized zirconia), GDC (gadolinium-doped ceria), YDC (yttrium-doped ceria), SDC (samarium-doped ceria), LSGM (strontium- and magnesium-doped lanthanum gallate), or the like can be used as the material for forming the electrolyte layer 4. In particular, zirconia-based ceramics are favorably used. Using zirconia-based ceramics for the electrolyte layer 4 makes it possible to increase the operation temperature of the SOFC in which the electrochemical element E is used compared with the case where ceria-based ceramics are used. For example, when the electrochemical element E is used in the SOFC, by adopting a system configuration in which a material such as YSZ that can exhibit high electrolyte performance even in a high temperature range of approximately 650° C. or higher is used as the material for forming the electrolyte layer 4, a hydrocarbon-based raw fuel material such as city gas or LPG is used as the raw fuel for the system, and the raw fuel material is reformed into anode gas of the SOFC through steam reforming or the like, it is thus possible to construct a high-efficiency SOFC system in which heat generated in a cell stack of the SOFC is used to reform raw fuel gas.

It is preferable to form the electrolyte layer 4 using low-temperature heating (not performing heating treatment in a high temperature range of higher than 1100° C., but rather performing a wet process using heating treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Due to these film formation processes that can be used in a low temperature range, an electrolyte layer 4 that is dense and has high gas-tightness and gas barrier properties is obtained without using heating in a high temperature range of higher than 1100° C., for example. Therefore, it is possible to prevent damage to the metal substrate 1, suppress element interdiffusion between the metal substrate 1 and the electrode layer 2, and realize an electrochemical element E that has excellent performance and durability. In particular, using low-temperature heating, a spray coating technique, or the like makes it possible to realize a low-cost element and is thus preferable. Furthermore, using a spray coating technique makes it easy to obtain, in a low temperature range, an electrolyte layer that is dense and has high gas-tightness and gas barrier properties, and is thus more preferable.

The electrolyte layer 4 is given a dense configuration in order to block gas leakage of anode gas and cathode gas and exhibit high ion conductivity. The electrolyte layer 4 preferably has a denseness of 90% or more, more preferably 95% or more, and even more preferably 98% or more. When the electrolyte layer 4 is formed as a uniform layer, the denseness is preferably 95% or more, and more preferably 98% or more. When the electrolyte layer 4 has a multilayer configuration, at least a portion thereof preferably includes a layer (dense electrolyte layer) having a denseness of 98% or more, and more preferably a layer (dense electrolyte layer) having a denseness of 99% or more. The reason for this is that an electrolyte layer that is dense and has high gas-tightness and gas barrier properties can be easily formed due to such a dense electrolyte layer being included as a portion of the electrolyte layer even when the electrolyte layer has a multilayer configuration.

Reaction Preventing Layer

The reaction preventing layer 5 can be formed as a thin layer on/over the electrolyte layer 4. When it is formed as a thin layer, the thickness can be set to approximately 1 μm to 100 μm, preferably approximately 2 μm to 50 μm, and more preferably approximately 4 μm to 25 μm, for example. This thickness makes it possible to ensure sufficient performance while also achieving cost reduction by reducing the used amount of expensive reaction preventing layer material. The material for forming the reaction preventing layer 5 need only be capable of preventing reactions between the component of the electrolyte layer 4 and the component of the counter electrode layer 6. For example, a ceria-based material or the like is used. Introducing the reaction preventing layer 5 between the electrolyte layer 4 and the counter electrode layer 6 effectively suppresses reactions between the material constituting the counter electrode layer 6 and the material constituting the electrolyte layer 4 and makes it possible to improve long-term stability in the performance of the electrochemical element E. Forming the reaction preventing layer 5 using, as appropriate, a method through which the reaction preventing layer 5 can be formed at a treatment temperature of 1100° C. or lower makes it possible to suppress damage to the metal substrate 1, suppress element interdiffusion between the metal substrate 1 and the electrode layer 2, and realize an electrochemical element E that has excellent performance and durability, and is thus preferable. For example, the reaction preventing layer 5 can be formed using, as appropriate, low-temperature heating, a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. In particular, using low-temperature heating, a spray coating technique, or the like makes it possible to realize a low-cost element and is thus preferable. Furthermore, using low-temperature heating makes it possible to facilitate handling of raw materials and is thus more preferable.

Counter Electrode Layer

The counter electrode layer 6 can be formed as a thin layer on/over the electrolyte layer 4 or the reaction preventing layer 5. When it is formed as a thin layer, the thickness can be set to approximately 1 μm to 100 μm, and preferably approximately 5 μm to 50 μm, for example. This thickness makes it possible to ensure sufficient electrode performance while also achieving cost reduction by reducing the used amount of expensive counter electrode layer material. A complex oxide such as LSCF or LSM, or a ceria-based oxide, or a mixture thereof can be used as the material for forming the counter electrode layer 6, for example. In particular, it is preferable that the counter electrode layer 6 includes a perovskite oxide containing two or more atoms selected from the group consisting of La, Sr, Sm, Mn, Co, and Fe. The counter electrode layer 6 constituted by the above-mentioned material functions as a cathode.

It should be noted that forming the counter electrode layer 6 using, as appropriate, a method through which the counter electrode layer 6 can be formed at a treatment temperature of 1100° C. or lower makes it possible to suppress damage to the metal substrate 1, suppress element interdiffusion between the metal substrate 1 and the electrode layer 2, and realize an electrochemical element E that has excellent performance and durability, and is thus preferable. For example, the counter electrode layer 6 can be formed using, as appropriate, low-temperature heating, a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. In particular, using low-temperature heating, a spray coating technique, or the like makes it possible to realize a low-cost element and is thus preferable. Furthermore, using low-temperature heating makes it possible to facilitate handling of raw materials and is thus more preferable.

Solid Oxide Fuel Cell

The electrochemical element E configured as described above can be used as a power generating cell for a solid oxide fuel cell. For example, fuel gas containing hydrogen is supplied from the back surface of the metal substrate 1 through the through holes 1a to the electrode layer 2, air is supplied to the counter electrode layer 6 serving as a counter electrode of the electrode layer 2, and the operation is performed at a temperature of 500° C. or higher and 900° C. or lower, for example. Accordingly, the oxygen $O_2$ included in air reacts with electrons $e^-$ in the counter electrode layer 6, thus producing oxygen ions $O^{2-}$. The oxygen ions $O^{2-}$ move through the electrolyte layer 4 to the electrode layer 2. In the electrode layer 2, the hydrogen $H_2$ included in the supplied fuel gas reacts with the oxygen ions $O^{2-}$, thus producing water $H_2O$ and electrons $e^-$. With these reactions, electromotive force is generated between the electrode layer 2 and the counter electrode layer 6. In this case, the electrode layer 2 functions as a fuel electrode (anode) of the SOFC, and the counter electrode layer 6 functions as an air electrode (cathode).

Manufacturing Method for Electrochemical Element

Next, a manufacturing method for the electrochemical element E will be described.

Electrode Layer Forming Step

In an electrode layer forming step, the electrode layer 2 is formed as a thin film in a region that is broader than the region provided with the through holes 1a, on/over the front surface of the metal substrate 1. The through holes of the metal substrate 1 can be provided through laser processing or the like. As described above, the electrode layer 2 can be formed using low-temperature heating (a wet process using heating treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal substrate 1.

The following is an example of the case where low-temperature heating is performed as the electrode layer forming step. First, a material paste is produced by mixing powder of the material for forming the electrode layer 2 and a solvent (dispersion medium), and is applied to the front surface of the metal substrate 1. Then, heating is performed at a temperature of 800° C. to 1100° C.

Diffusion Suppressing Layer Forming Step

The metal oxide thin layer 1b (diffusion suppressing layer) is formed on/over the surface of the metal substrate 1 during the heating step in the above-described electrode layer forming step. It should be noted that it is preferable that the above-mentioned heating step includes a heating step in which the heating atmosphere satisfies the atmospheric condition that the oxygen partial pressure is low because a high-quality metal oxide thin layer 1b (diffusion suppressing layer) that has a high element interdiffusion suppressing effect and has a low resistance value is formed. In a case where a coating method that does not include heating is performed as the electrode layer forming step, for example, a separate diffusion suppressing layer forming step may also be included. In any case, it is desirable to perform these steps at a temperature of 1100° C. or lower such that damage to the metal substrate 1 can be suppressed.

Intermediate Layer Forming Step

In an intermediate layer forming step, the intermediate layer 3 is formed as a thin layer on/over the electrode layer 2 so as to cover the electrode layer 2. As described above, the intermediate layer 3 can be formed using low-temperature heating (a wet process using heating treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal substrate 1.

The following is an example of the case where low-temperature heating is performed as the intermediate layer forming step. First, a material paste is produced by mixing powder of the material for forming the intermediate layer 3 and a solvent (dispersion medium), and is applied to the electrode layer 2. Then, heating is performed at a temperature of 800° C. to 1100° C.

Electrolyte Layer Forming Step

In an electrolyte layer forming step, the electrolyte layer 4 is formed as a thin layer on/over the intermediate layer 3 so as to cover the electrode layer 2 and the intermediate layer 3. As described above, the electrolyte layer 4 can be formed using low-temperature heating (a wet process using heating treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal substrate 1.

It is desirable to perform a spray coating technique as the electrolyte layer forming step in order to form a high-quality electrolyte layer 4 that is dense and has high gas-tightness and gas barrier properties in a temperature range of 1100° C. or lower. In this case, the material for forming the electrolyte layer 4 is sprayed on to the intermediate layer 3 on/over the metal substrate 1, and the electrolyte layer 4 is thus formed.

Reaction Preventing Layer Forming Step

In a reaction preventing layer forming step, the reaction preventing layer 5 is formed as a thin layer on/over the electrolyte layer 4. As described above, the reaction preventing layer 5 can be formed using low-temperature heating, a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal substrate 1. It should be noted that leveling treatment, surface cutting treatment, or surface polishing treatment may be performed after the formation of the reaction preventing layer 5, or pressing processing may be performed after wet formation and before heating in order to flatten the upper surface of the reaction preventing layer 5.

Counter Electrode Layer Forming Step

In a counter electrode layer forming step, the counter electrode layer 6 is formed as a thin layer on/over the reaction preventing layer 5. As described above, the counter electrode layer 6 can be formed using low-temperature heating, a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal substrate 1.

In this manner, the electrochemical element E can be manufactured.

It should be noted that a configuration in which the electrochemical element E does not include both or either of the intermediate layer 3 and the reaction preventing layer 5 is also possible. That is, a configuration in which the electrode layer 2 and the electrolyte layer 4 are in contact with each other, or a configuration in which the electrolyte layer 4 and the counter electrode layer 6 are in contact with each other is also possible. In this case, in the above-described manufacturing method, the intermediate layer forming step and the reaction preventing layer forming step are omitted. It should be noted that it is also possible to add a step of forming another layer or to form a plurality of layers of the same type one on/over top of another, but in any case, it is desirable to perform these steps at a temperature of 1100° C. or lower.

Measurement of Amount of Volatilized Cr

In order to confirm a difference in the amount of volatilized Cr due to a difference in the composition between metal materials, the amount of volatilized Cr was measured for each metal material shown in Table 1 below. It should be noted that the unit for the values in the compositions shown in Table 1 is "mass %". The symbol "-" in the cells indicates "smaller than or equal to the detection limit". Metal plate samples with a width of 25 mm and a length of 250 to 300 mm were used, and the metal materials of the metal plate samples were exposed to air at 0.5 L/minute (dew point: 20° C.) at a temperature of 750° C. or 850° C. Then, the amount (integrated amount) of Cr volatilized during a predetermined period of time was measured. Table 2 shows the measurement results. It should be noted that the unit for the amount of volatilized Cr shown in Table 2 is "µg/600 cm$^2$", and the values obtained through conversion into values corresponding to the amount of Cr volatilized from a metal surface area of 600 cm$^2$ are shown. It should be noted that, before performing the test to measure the amount of volatilized Cr, all of the samples were subjected to two-stage heating pretreatment performed at 850° C. and 1000° C. (this treatment corresponds to the above-described diffusion suppressing layer forming step).

TABLE 1

|    | Ex. 1 | Ex. 2 | Comp. Ex. 1 | Comp. Ex. 2 | Comp. Ex. 3 | Comp. Ex. 4 |
| --- | --- | --- | --- | --- | --- | --- |
| Si | 0.06 | 0.094 | 0.01 | 0.1 | 0.15 | 0.25 |
| Mn | 0.5 | 0.17 | 0.4 | 0.1 | 0.15 | 0.48 |
| Cu | — | 0.43 | 0.001 | — | — | 0.02 |
| Ni | 0.49 | 0.18 | 0.16 | — | — | 0.13 |
| Cr | 22.5 | 20.82 | 22 | 17.3 | 22.2 | 16.13 |
| Al | 0.03 | 0.04 | 0.001 | — | — | — |
| Mo | — | 0.053 | 0.001 | — | 1.1 | 0.03 |
| Nb | — | 0.008 | 0.001 | 0.15 | 0.3 | 0.01 |
| Ti | — | 0.325 | 0.06 | — | 0.1 | — |
| Zr | 0.3 | — | — | — | — | — |
| La | 0.1 | — | 0.07 | — | — | — |

TABLE 2

|  | 750° C. 250 hours | 850° C. 100 hours | 850° C. 1000 hours |
| --- | --- | --- | --- |
| Ex. 1 | 370 | 195 | (not measured) |
| Ex. 2 | 530 | 300 | 8900 |
| Comp. Ex. 1 | 530 | 300 | 11500 |
| Comp. Ex. 2 | 690 | 540 | (not measured) |
| Comp. Ex. 3 | 620 | 460 | (not measured) |
| Comp. Ex. 4 | 600 | 260 | (not measured) |

As shown in Table 2, in the cases of the samples of Comparative Examples 2 to 4, the amount of volatilized Cr increased either in the condition of 750° C. for 250 hours or in the condition of 850° C. for 100 hours. In the case of the sample of Comparative Example 1, the amount of volatilized Cr was the same as that in the case of the sample of Example 2 in the condition of 750° C. for 250 hours and the condition of 850° C. for 100 hours, but the amount of volatilized Cr significantly increased in the condition of 850° C. for 1000 hours compared with Example 2. In the cases of the samples of Example 1 and Example 2, the obtained values were favorable in all of the conditions. It was confirmed from these results that, in the cases of Example 1 and Example 2, volatilization of Cr from the metal support can be suppressed even in long-period high-temperature environments.

Electric Resistance in State Where Electric Layer is Formed

In order to confirm, in a state in which the electrode layer is formed, a difference in the electric resistance value due to a difference in the composition between metal materials, electrode layers 2 were formed on/over the front surface and the back surface of a sample of a metal substrate 1 obtained by processing each of the materials shown in Table 1 above into a circular shape with a diameter of 25 mm (and a thickness of 0.3 mm), and the electric resistance value was measured. It should be noted that the experiment samples were produced as follows.

A paste was produced by mixing 60 wt % of NiO powder and 40 wt % of YSZ powder and adding an organic binder and an organic solvent (dispersion medium) thereto. The paste was used to apply electrode layers 2 to regions with a radius of 5 mm from the center of the front surface and the back surface of a metal substrate 1. At this time, the application thereto was performed such that the electrode layers 2 had a thickness of 10 to 15 μm.

Next, the metal substrates 1 to which the electrode layers 2 were applied were subjected to a two-stage heating treatment performed at 850° C. and 1000° C. (this treatment corresponds to the heating step of the electrode layer forming step, which also serves as the above-described diffusion suppressing layer forming step), and the experimental samples were thus obtained.

Next, the electric resistance value between the electrode layer on/over the front surface of each sample and the electrode layer on/over the back surface thereof was measured. The measurements were performed before (initial resistance value) and after (resistance value after 100 hours) the sample was exposed to hydrogen of 0.5 L/minute (dew point: 20° C.) at a temperature of 850° C. for 100 hours, simulating the atmosphere of a fuel electrode of a fuel cell. Table 3 shows the results. The unit for the resistance values shown in Table 3 is "Ω".

TABLE 3

| | Initial resistance | Resistance value after 100 hours | Increase in resistance value |
| --- | --- | --- | --- |
| Ex. 1 | 0.36 | 0.64 | 0.28 |
| Ex. 2 | 0.11 | 0.37 | 0.26 |
| Comp. Ex. 1 | 0.29 | 0.67 | 0.38 |
| Comp. Ex. 2 | 0.13 | 0.85 | 0.72 |
| Comp. Ex. 3 | 0.31 | 1.41 | 1.10 |

As shown in Table 3, in the cases of the samples of Example 1 and Example 2, an increase in the resistance value after the exposure to hydrogen at 850° C. for 100 hours was smaller compared with the cases of the samples of Comparative Examples 1 to 3. It was confirmed from these results that, in the cases of Example 1 and Example 2, the electric resistance value could be suppressed to a low level, thus making it possible to realize a high-performance electrochemical element.

Second Embodiment

An electrochemical element E, an electrochemical module M, an electrochemical device Y, and an energy system Z according to a second embodiment will be described with reference to FIGS. 2 and 3.

Figure 2:
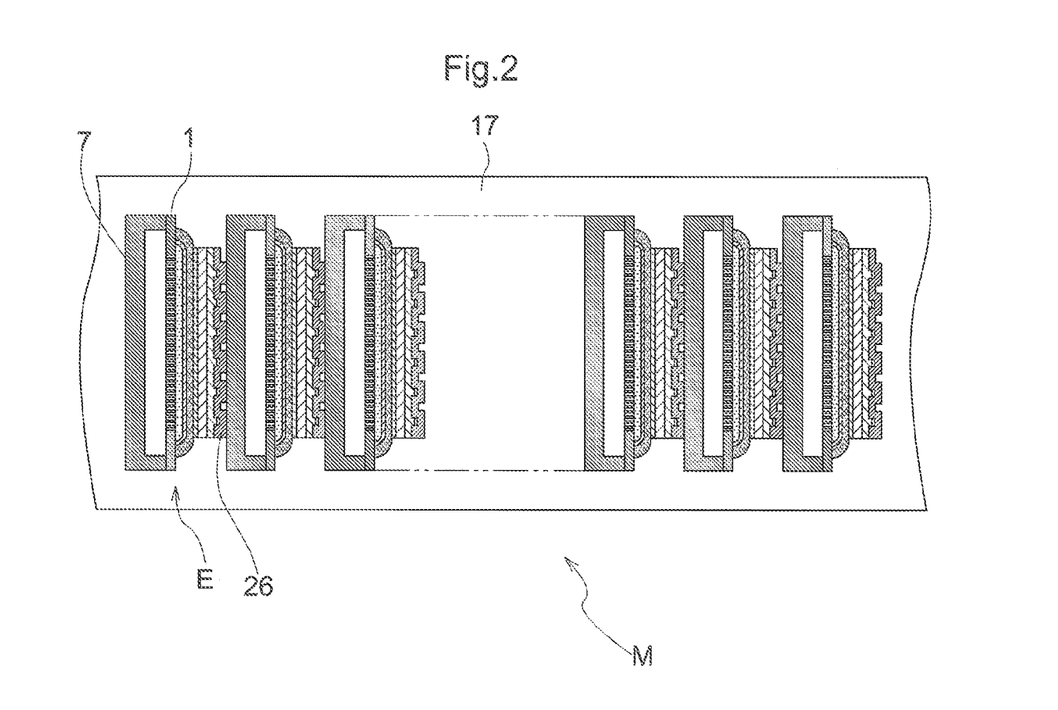
FIG. 2 is a schematic diagram showing configurations of electrochemical elements and an electrochemical module.

As shown in FIG. 2, in the electrochemical element E according to the second embodiment, a U-shaped member 7 is attached to the back surface of the metal substrate 1, and the metal substrate 1 and the U-shaped member 7 form a tubular support.

The electrochemical module M is configured by stacking/assembling a plurality of electrochemical elements E with collector members 26 being sandwiched therebetween. Each of the collector members 26 is joined to the counter electrode layer 6 of the electrochemical element E and the U-shaped member 7, and electrically connects them.

The electrochemical module M includes a gas manifold 17, the collector members 26, a terminal member, and a current extracting unit. One open end of each tubular support in the stack/assembly of the plurality of electrochemical elements E is connected to the gas manifold 17, and gas is supplied from the gas manifold 17 to the electrochemical elements E. The supplied gas flows inside the tubular supports, and is supplied to the electrode layers 2 through the through holes 1a of the metal substrates 1.

Figure 3:
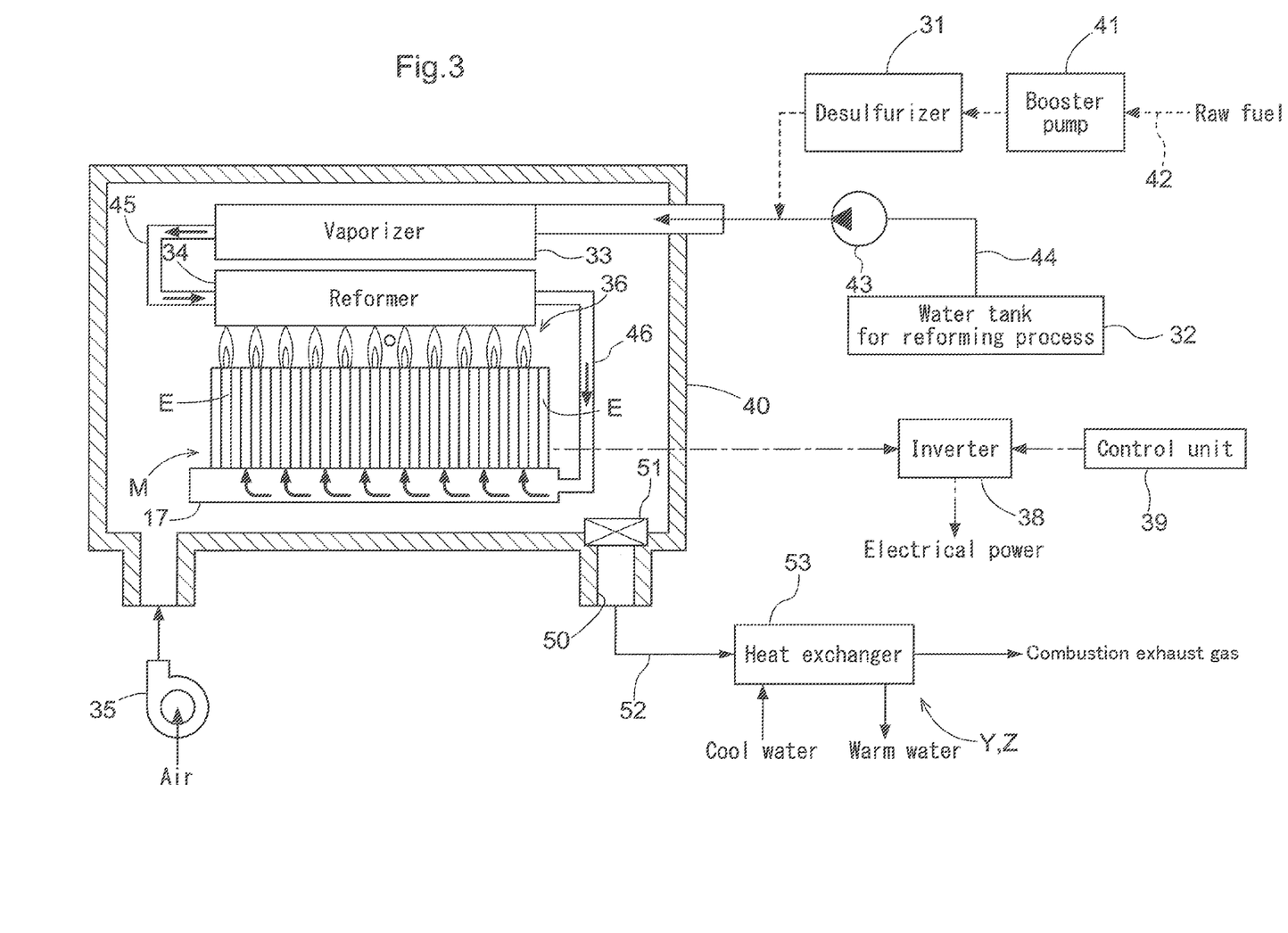
FIG. 3 is a schematic diagram showing configurations of an electrochemical device and an energy system.

FIG. 3 shows an overview of the energy system Z and the electrochemical device Y.

The energy system Z includes the electrochemical device Y, and a heat exchanger 53 serving as a waste heat management unit that reuses heat discharged from the electrochemical device Y.

The electrochemical device Y includes the electrochemical module M and a fuel supply unit that includes a desulfurizer 31 and a reformer 34 and supplies fuel gas containing a reducible component to the electrochemical module M, and the electrochemical device Y includes an inverter 38 that extracts electrical power from the electrochemical module M.

Specifically, the electrochemical device Y includes the desulfurizer 31, a reformed water tank (water tank for reforming process) 32, a vaporizer 33, the reformer 34, a blower 35, a combustion unit 36, the inverter 38, a control unit 39, a storage container 40, and the electrochemical module M.

The desulfurizer 31 removes sulfur compound components contained in a hydrocarbon-based raw fuel such as city gas (i.e., performs desulfurization). When a sulfur compound is contained in the raw fuel, the inclusion of the desulfurizer 31 makes it possible to suppress the influence that the sulfur compound has on the reformer 34 or the electrochemical elements E. The vaporizer 33 produces water vapor from reformed water supplied from the reformed water tank 32. The reformer 34 uses the water vapor produced by the vaporizer 33 to perform steam reforming of the raw fuel desulfurized by the desulfurizer 31, thus producing reformed gas containing hydrogen.

The electrochemical module M generates electricity by causing an electrochemical reaction to occur with use of the reformed gas supplied from the reformer 34 and air supplied from the blower 35. The combustion unit 36 mixes the reaction exhaust gas discharged from the electrochemical module M with air, and burns combustible components in the reaction exhaust gas.

The electrochemical module M includes a plurality of electrochemical elements E and the gas manifold 17. The electrochemical elements E are arranged side-by-side and electrically connected to each other, and one end portion (lower end portion) of each of the electrochemical elements E is fixed to the gas manifold 17. The electrochemical elements E generate electricity by causing an electrochemical reaction to occur between the reformed gas supplied via the gas manifold 17 and air supplied from the blower 35.

The inverter 38 adjusts the electrical power output from the electrochemical module M to obtain the same voltage and frequency as electrical power received from a commercial system (not shown). The control unit 39 controls the operation of the electrochemical device Y and the energy system Z.

The vaporizer 33, the reformer 34, the electrochemical module M, and the combustion unit 36 are stored in the storage container 40. The reformer 34 performs reformation processing on the raw fuel with use of combustion heat produced by the combustion of reaction exhaust gas in the combustion unit 36.

The raw fuel is supplied to the desulfurizer 31 via a raw fuel supply passage 42, due to operation of a booster pump 41. The reformed water in the reformed water tank 32 is supplied to the vaporizer 33 via a reformed water supply passage 44, due to operation of a reformed water pump 43. The raw fuel supply passage 42 merges with the reformed water supply passage 44 at a location on the downstream side of the desulfurizer 31, and the reformed water and the raw fuel, which have been merged outside of the storage container 40, are supplied to the vaporizer 33 provided in the storage container 40.

The reformed water is vaporized by the vaporizer 33 to produce water vapor. The raw fuel, which contains the water vapor produced by the vaporizer 33, is supplied to the reformer 34 via a vapor-containing raw fuel supply passage 45. In the reformer 34, the raw fuel is subjected to steam reforming, thus producing reformed gas that includes hydrogen gas as a main component (first gas including a reducible component). The reformed gas produced in the reformer 34 is supplied to the gas manifold 17 of the electrochemical module M via a reformed gas supply passage 46.

The reformed gas supplied to the gas manifold 17 is distributed among the electrochemical elements E, and is supplied to the electrochemical elements E from the lower ends, which are the connection portions where the electrochemical elements E and the gas manifold 17 are connected to each other. Mainly the hydrogen (reducible component) in the reformed gas is used in the electrochemical reaction in the electrochemical elements E. The reaction exhaust gas, which contains remaining hydrogen gas not used in the reaction, is discharged from the upper ends of the electrochemical elements E to the combustion unit 36.

The reaction exhaust gas is burned in the combustion unit 36, and combustion exhaust gas is discharged from a combustion exhaust gas outlet 50 to the outside of the storage container 40. A combustion catalyst unit 51 (e.g., a platinum-based catalyst) is provided in the combustion exhaust gas outlet 50, and reducible components such as carbon monoxide and hydrogen contained in the combustion exhaust gas are removed by combustion. The combustion exhaust gas discharged from the combustion exhaust gas outlet 50 is sent to the heat exchanger 53 via a combustion exhaust gas discharge passage 52.

The heat exchanger 53 uses supplied cool water to perform heat exchange on the combustion exhaust gas produced by combustion in the combustion unit 36, thus producing warm water. In other words, the heat exchanger 53 operates as a waste heat management unit that reuses heat discharged from the electrochemical device Y.

It should be noted that instead of the waste heat management unit, it is possible to provide a reaction exhaust gas using unit that uses the reaction exhaust gas that is discharged from (not burned in) the electrochemical module M. The reaction exhaust gas contains remaining hydrogen gas that was not used in the reaction in the electrochemical elements E. In the reaction exhaust gas using unit, the remaining hydrogen gas is used to achieve effective energy utilization by heat utilization through combustion, power generation in a fuel cell, or the like.

Third Embodiment

Figure 4:
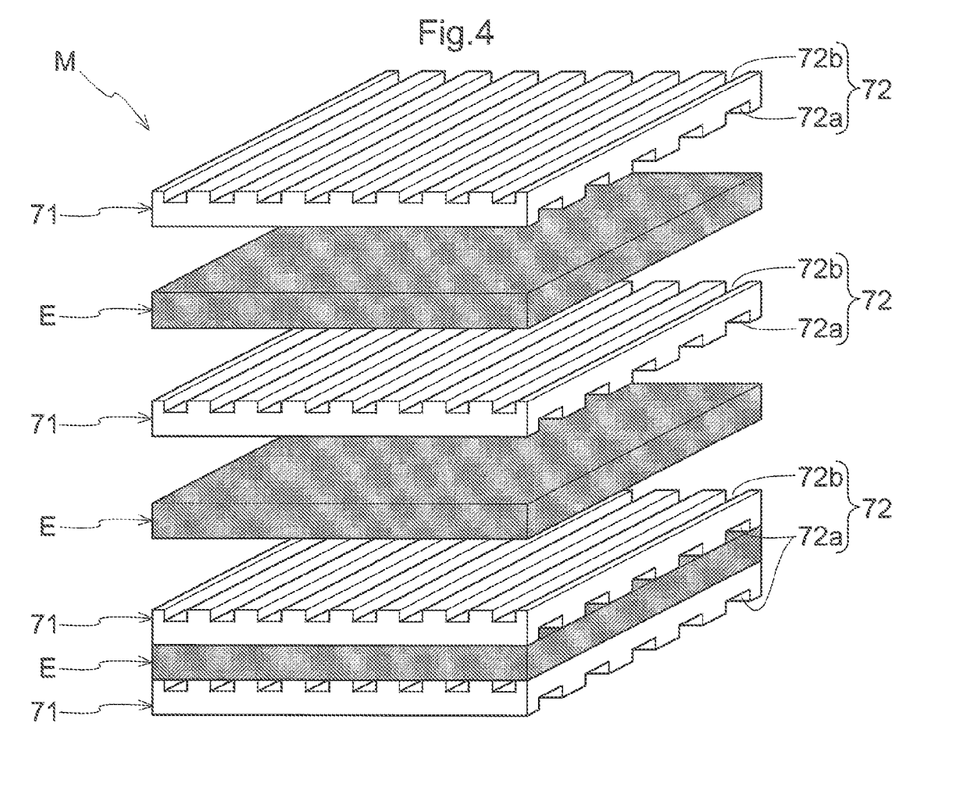
FIG. 4 is a schematic diagram showing a configuration of an electrochemical module.

FIG. 4 shows another embodiment of the electrochemical module M. The electrochemical module M according to a third embodiment is configured by stacking the above-described electrochemical elements E with cell connecting members 71 being sandwiched therebetween.

The cell connecting members 71 are each a plate-shaped member that has electron conductivity and does not have gas permeability, and the upper surface and the lower surface are respectively provided with grooves 72 that are orthogonal to each other. The cell connecting members 71 can be formed using a metal such as stainless steel or a metal oxide.

As shown in FIG. 4, when the electrochemical elements E are stacked with the cell connecting members 71 being sandwiched therebetween, gas can be supplied to the electrochemical elements E through the grooves 72. Specifically, the grooves 72 on one side are first gas passages 72a and supply gas to the front side of one electrochemical element E, that is to say the counter electrode layer 6. The grooves 72 on the other side are second gas passages 72b and supply gas from the back side of one electrochemical element E, that is, the back side of the metal substrate 1, through the through holes 1a to the electrode layers 2.

In the case of operating this electrochemical module M as a fuel cell, oxygen is supplied to the first gas passages 72a, and hydrogen is supplied to the second gas passages 72b. Accordingly, a fuel cell reaction progresses in the electrochemical elements E, and electromotive force and electrical current are generated. The generated electrical power is extracted to the outside of the electrochemical module M from the cell connecting members 71 at the two ends of the stack of electrochemical elements E.

It should be noted that although the grooves 72 that are orthogonal to each other are respectively formed on the front surface and the back surface of each of the cell connecting members 71 in this third embodiment, grooves 72 that are parallel to each other can be respectively formed on the front surface and the back surface of each of the cell connecting members 71.

Other Embodiments (1) Although the electrochemical elements E are used in a solid oxide fuel cell in the above-described embodiments, the electrochemical elements E can also be used in a solid oxide electrolytic cell, an oxygen sensor using a solid oxide, and the like.

(2) Although the present application is applied to a metal-supported solid oxide fuel cell in which the metal substrate 1 serves as a support in the above-described embodiments, the present application can also be applied to an electrode-supported solid oxide fuel cell in which the electrode layer 2 or counter electrode layer 6 serves as a support, or an electrolyte-supported solid oxide fuel cell in which the electrolyte layer 4 serves as a support. In such cases, the functions of a support can be obtained by forming the electrode layer 2, counter electrode layer 6, or electrolyte layer 4 to have a required thickness.

(3) In the above-described embodiments, a composite material such as NiO-GDC, Ni-GDC, NiO—YSZ, Ni—YSZ, CuO—$CeO_2$, or Cu—$CeO_2$ is used as the material for forming the electrode layer 2, and a complex oxide such as LSCF or LSM is used as the material for forming the counter electrode layer 6. With this configuration, the electrode layer 2 serves as a fuel electrode (anode) when hydrogen gas is supplied thereto, and the counter electrode layer 6 serves as an air electrode (cathode) when air is supplied thereto, thus making it possible to use the electrochemical element E as a cell for a solid oxide fuel cell. It is also possible to change this configuration and thus configure an electrochemical element E such that the electrode layer 2 can be used as an air electrode and the counter electrode layer 6 can be used as a fuel electrode. That is, a complex oxide such as LSCF or LSM is used as the material for forming the electrode layer 2, and a composite material such as NiO-GDC, Ni-GDC, NiO—YSZ, Ni—YSZ, CuO—$CeO_2$, or Cu—$CeO_2$ is used as the material for forming the counter electrode layer 6. With this configuration, the electrode layer 2 serves as an air electrode when air is supplied thereto, and the counter electrode layer 6 serves as a fuel electrode when hydrogen gas is supplied thereto, thus making it possible to use the electrochemical element E as a cell for a solid oxide fuel cell.

It should be noted that the configurations disclosed in the above-described embodiments can be used in combination with configurations disclosed in other embodiments as long as they are compatible with each other. The embodiments disclosed in this specification are illustrative, and embodiments of the present invention are not limited thereto and can be modified as appropriate without departing from the object of the present invention.

INDUSTRIAL APPLICABILITY

The present invention can be applied to an electrochemical element and a cell for a solid oxide fuel cell.

LIST OF REFERENCE NUMERALS

1: Metal substrate (metal support)
1*a*: Through hole
2: Electrode layer
3: Intermediate layer
4: Electrolyte layer
4*a*: Upper surface of electrolyte layer
5: Reaction preventing layer
6: Counter electrode layer
B: Substrate with electrode layer
E: Electrochemical element
M: Electrochemical module
y: Electrochemical device
Z: Energy system

The invention claimed is:

1. An electrochemical element comprising:
a metal support; and
an electrode layer formed on/over the metal support,
wherein the metal support is made of any one of a Fe—Cr based alloy that contains Ti in an amount of 0.15 mass % or more and 1.0 mass % or less, a Fe—Cr based alloy that contains Zr in an amount of 0.15 mass % or more and 1.0 mass % or less, and a Fe—Cr based alloy that contains Ti and Zr, a total content of Ti and Zr being 0.15 mass % or more and 1.0 mass % or less, and
wherein the metal support contains Cu in an amount of 0.10 mass % or more and 1.0 mass % or less.

2. The electrochemical element according to claim 1, wherein the metal support contains Cr in an amount of 18 mass % or more and 25 mass % or less.

3. The electrochemical element according to claim 1, wherein the electrode layer is formed on/over one surface of the metal support, and the metal support is provided with a through hole that penetrates the metal support from one surface to the other surface.

4. The electrochemical element according to claim 1, wherein the metal support is made of a magnetic substance.

5. The electrochemical element according to claim 1, wherein a portion or all of a surface of the metal support is covered with a metal oxide thin layer.

6. The electrochemical element according to claim 1, comprising:
an electrolyte layer; and
a counter electrode layer,
wherein the electrolyte layer is arranged on/over the electrode layer, and the counter electrode layer is arranged on/over the electrolyte layer.

7. An electrochemical module in which a plurality of the electrochemical elements according to claim 1 are arranged in an assembled state.

8. An electrochemical device comprising at least the electrochemical module according to claim 7 and a reformer and includes a fuel supply unit which supplies fuel gas containing a reducible component to the electrochemical module.

9. An electrochemical device comprising at least the electrochemical module according to claim 7 and an inverter that extracts electrical power from the electrochemical module.

10. An energy system comprising:
the electrochemical device according to claim 8; and
a waste heat management unit that reuses heat discharged from the electrochemical device.

11. A solid oxide fuel cell comprising:
the electrochemical element according to claim 1,
wherein a power generation reaction is caused in the electrochemical element.

12. A manufacturing method for an electrochemical element including a metal support and an electrode layer,
the metal support being made of any one of a Fe—Cr based alloy that contains Ti in an amount of 0.15 mass % or more and 1.0 mass % or less, a Fe—Cr based alloy that contains Zr in an amount of 0.15 mass % or more and 1.0 mass % or less, and a Fe—Cr based alloy that contains Ti and Zr, a total content of Ti and Zr being 0.15 mass % or more and 1.0 mass % or less, wherein the metal support contains Cu in an amount of 0.10 mass % or more and 1.0 mass % or less,
the method comprising an electrode layer forming step of forming an electrode layer with gas permeability on/over the metal support.

* * * * *